United States Patent
Hu et al.

(10) Patent No.: US 10,427,945 B2
(45) Date of Patent: Oct. 1, 2019

(54) ION SIEVE MATERIAL, AND METHODS OF PREPARING AND USING THE SAME

(71) Applicant: Shenzhen Donglihua Technology Co., Ltd., Shenzhen, Guangdong (CN)

(72) Inventors: Wei Hu, Shenzhen (CN); Fanghua Chen, Shenzhen (CN); Zhenyu Chen, Shenzhen (CN); Weihua Wan, Shenzhen (CN); Peng Zhou, Shenzhen (CN); Yunfei Zhang, Guangdong (CN)

(73) Assignee: Shenzhen Donglihua Technology Co., Ltd., Shenzhen (CN)

( * ) Notice: Subject to any disclaimer, the term of this patent is extended or adjusted under 35 U.S.C. 154(b) by 153 days.

(21) Appl. No.: 15/801,283

(22) Filed: Nov. 1, 2017

(65) Prior Publication Data

US 2018/0050918 A1     Feb. 22, 2018

Related U.S. Application Data

(63) Continuation of application No. PCT/CN2016/086509, filed on Jun. 21, 2016.

(30) Foreign Application Priority Data

Jun. 16, 2016 (CN) .......................... 2016 1 0428113

(51) Int. Cl.
    *C01B 33/12* (2006.01)
    *B01J 20/10* (2006.01)
    *B01J 20/04* (2006.01)
    *B01J 20/30* (2006.01)
    *C01B 37/00* (2006.01)
    *B01J 20/06* (2006.01)
    *B01J 20/18* (2006.01)

(52) U.S. Cl.
    CPC ........... *C01B 33/126* (2013.01); *B01J 20/041* (2013.01); *B01J 20/06* (2013.01); *B01J 20/10* (2013.01); *B01J 20/186* (2013.01); *B01J 20/3007* (2013.01); *B01J 20/3028* (2013.01); *B01J 20/3078* (2013.01); *B01J 20/3085* (2013.01); *C01B 37/00* (2013.01)

(58) Field of Classification Search
    CPC .... C01B 33/126; C01B 37/00; B01J 20/3085; B01J 20/186; B01J 20/06; B01J 20/3078; B01J 20/3028; B01J 20/3007; B01J 20/041; B01J 20/10
    See application file for complete search history.

(56) References Cited

U.S. PATENT DOCUMENTS 6,143,057 A * 11/2000 Bulow ................... B01D 53/02
                                                502/79

FOREIGN PATENT DOCUMENTS

CN          105107457 B * 12/2017

* cited by examiner

*Primary Examiner* — Anthony J Zimmer

(57) ABSTRACT

The present invention relates to an ion sieve material, comprising, based on the weight of the ion sieve material, 15-55% by weight (wt %) of $SiO_2$, 5-50 wt % of an auxiliary material, and 15-48 wt % of at least one functional metal oxide, wherein the metal in the functional metal oxide is a monovalent and/or divalent metal. A method for preparing the ion sieve material and a method of using the same are further provided.

4 Claims, No Drawings

ION SIEVE MATERIAL, AND METHODS OF PREPARING AND USING THE SAME

CROSS-REFERENCE TO RELATED APPLICATIONS

This application is a continuation application of PCT Application No. PCT/CN2016/086509 filed on Jun. 21, 2016 which claims priority to Chinese Application No. 201610428113.0 filed on Jun. 16, 2016, the entire contents of which are hereby incorporated by reference.

TECHNICAL FIELD

The present invention relates to the field of production and purification in salt compound industry, and more particularly to an ion sieve material and methods of preparing and using the same.

BACKGROUND

In 1932, McBain put forward the concept of "molecular sieve". Molecular sieves are a class of materials with uniform micropores having a pore size that is equivalent to the common molecular size. Molecular sieves are widely used, for example, as high-performance desiccants, selective adsorbents, catalysts, and ion exchangers, etc. However, the chemically synthesized molecular sieves are expensive. The commonly used molecular sieves are crystalline silicates or aluminosilicates, which are Si—O tetrahedrons or Al—O tetrahedrons bonded by oxygen bridges to form a pore system and cavity system of molecular size (usually 0.3 to 2 nm) and having the capability of screening various fluid molecules because the size and shape of the adsorbed molecules are different, and mainly used in automotive, architectural glass, medicine, paint & coatings, packaging and other fields. The working principle of molecular sieves includes adsorption function, where the adsorption of substances by the molecular sieves is physical adsorption (via van der Waals force), because the crystal cavity has a strong polarity and Coulomb field therein, and exhibits a strong adsorption capacity for the polar (such as water) and unsaturated molecules; and screening function, where the molecular sieve has a very uniform pore size distribution, and only the substance having a molecular diameter that is less than the pore diameter can enter the cavity of the molecular sieve. The molecules of different substances are discriminated according to the order of adsorption and the size. Therefore, such materials are vividly called "molecular sieves".

The salt lakes in the northwestern region of China contain abundant salt mineral resources. These salt mineral resources are very important for daily life, agriculture, industry and military industry. For example, potassium salt is the most important component in the potash fertilizers, a main component of explosives, and an important medium for heat storage by new energy resources; and sodium salt is an essential substance consumed by human in daily life. However, the brine in the salt lakes also contains a large amount of various metal ions and salt compounds. At present, chemical purification is generally an approach to effective use of these salt mineral resources. Such methods are costly and not environmentally friendly. Attempts are also made to extract the metal ions targetedly from the brine in the salt lakes by using an ion sieve. However, this method is less efficient when carried out in an aqueous solution, Accordingly, it is necessary to provide an environmentally friendly material and/or process for purifying a deteriorated or impurity-containing salt compound, so as to increase the production efficiency, and reduce the production cost.

SUMMARY OF THE INVENTION

Accordingly, the present invention is directed to an ion sieve material, and methods of preparing and using the same, to purify the deteriorated or impurity-containing salt compounds.

An ion sieve material comprises, based on the weight of the ion sieve material, 15-55% by weight (wt %) of $SiO_2$, 5-50 wt % of an auxiliary material, and 15-48 wt % of at least one one functional metal oxide, where the metal in the functional metal oxide is a monovalent and/or divalent metal Optionally, the content of $SiO_2$ is 30-50 wt %, the auxiliary material forms a polar covalent bond and an ionic bond with $SiO_2$, and the auxiliary material is at least one selected from the group consisting of phosphorous oxide, boron oxide, alumina, zirconia, chromium oxide, iron oxide, zinc oxide, bismuth oxide, cobalt oxide or titania.

Optionally, the content of the functional metal oxide is 18-36 wt %, and the functional metal oxide is at least one monovalent metal oxide, at least one divalent metal oxide or a mixture of at least one monovalent metal oxide and at least one divalent metal oxide.

Optionally, the monovalent metal oxide is derived from a raw material selected from a carbonate, a silicate, a fluoride, a sulfate, a nitrate, a phosphate, a hydroxide, an oxide, a chloride or a mixture thereof, and the content of the monovalent metal oxide in the ion sieve material is 0-40 wt %.

Optionally, the divalent metal oxide is derived from a raw material selected from a carbonate, a silicate, a fluoride, a sulfate, a nitrate, a phosphate, a hydroxide, an oxide, a chloride or a mixture thereof, and the content of the divalent metal oxide in the ion sieve material is 0-40 wt %.

Further, the present invention also provides a method for preparing an ion sieve material, which comprises the steps of:

providing raw $SiO_2$, a raw auxiliary material, and a raw material of a functional metal oxide, and mixing fully, where the contents in percents by weight of the components in the resultant ion sieve material product are $SiO_2$ 15-55 wt %, the auxiliary material 5-50 wt %, and the functional metal oxide 15-48 wt %; and heating the mixture to 900-1500° C. and stirring to a molten state, to form a metastable ion sieve precursor.

Optionally, in the preparation method, after the metastable ion sieve precursor is formed, the metastable ion sieve precursor is quenched by pouring the metastable ion sieve precursor into water at a temperature of 0-90° C., to obtain a granular ion sieve material.

Optionally, in the preparation method, after the metastable ion sieve precursor is formed, the metastable ion sieve precursor is cooled slowly to 400-900° C., and processed by mechanically drawing or through extrusion molding, to obtain a flake-like ion sieve material.

Further, the present invention also provides a method of using the ion sieve material, which comprises the steps of:

providing a molten liquid salt compound to be purified; and adding the ion sieve material to the molten liquid salt compound, and reacting at a temperature that is above the melting temperature of the liquid salt compound; and removing the ion sieve material after the concentration of the impurity metal ions to be purified in the molten liquid salt compound falls within a preset range.

Optionally, a sum of the valence of each impurity metal ion purified in the molten liquid salt compound multiplied by a corresponding mole number is equal to a sum of the valence of the metal ion in the functional metal oxide in the ion sieve material that is involved in the reaction multiplied by a corresponding mole number.

Compared with the prior art, the present invention has the following advantages.

Firstly, the choices of the components and the setting of the contents thereof in the ion sieve material are advantageous. Specifically, a ceramic auxiliary material of particular content is used to improve the polar covalent bond and the ionic bond formed with $SiO_2$, and a functional metal oxide of particular content is used in combination, such that the finally obtained ion sieve material has superior impurity ion adsorbing performance.

Notably, it is found through quantities of experiments that when the content of $SiO_2$ is 30-50 wt % and the content of the functional metal oxide is 18-36 wt %, the ion sieve material prepared has a good effect in application.

Secondly, because the factors critical to the ion sieve material of the present invention lies in the choices of the components and the setting of the contents thereof, the preparation is simple and convenient and the preparation process is easy; and different forms of ion sieve materials can be obtained by different ways of cooling.

Thirdly, during the use of the ion sieve material according to the present invention, the activity of the molten salt compound can be recovered efficiently by virtue of the ratio of the components in the ion sieve material, while no other impurity ions are introduced into the molten salt compound; and the metal impurity ions in the molten salt compound are effectively targetedly removed, and the spent ion sieve causes no pollution to the environment.

Lastly, because of the diverse processes for producing the ion sieve material in the present invention, various forms of ion sieve materials can be obtained, whereby the ion sieve material can be used in different forms in recovering the purity of the salt compound.

DETAILED DESCRIPTION

To make the technical problems to be solved, the technical solutions and the beneficial effects of the present invention clearer, the present invention will now be described in further detail by way of examples with reference to the accompanying drawings. It is to be understood that the specific examples described herein are merely illustrative of and are not intended to limit the present invention.

The present invention provides an ion sieve material for extracting or adsorbing impurity metal ions in a molten salt compound, so as to purify the molten salt compound.

The molten salt compound may be various salt compounds containing impurity metal ions, for example, the salt compounds such as lithium cobaltate, lithium nickelate, lithium manganate, and lithium iron phosphate necessitated in the lithium battery industry, where trace impurity ions contained in such salts will cause great negative impact on the battery efficiency; and for example, the molten salt bath used in chemical tempering by ion exchange, where during the tempering process of glass, after the molten salt bath for chemical tempering by ion exchange has been used for a period of time, more and more impurity metal ions exchanged out of the glass are accumulated in the molten salt bath, causing the deactivation of the molten salt bath, and the weakening of the glass tempering effect. In these application areas requiring removal of impurities from the molten salt compounds or the deactivated molten salt bath, the ion sieve material of the present invention is added and undergoes reaction at a temperature (that is higher than the melting point of the molten salt compound) for a period of time. As a result, the impurity metal ions are adsorbed or extracted by the ion sieve material, thereby purifying, enhancing or recovering the activity of the salt bath.

The ion sieve material has a composition comprising, based on the weight of the ion sieve material, 15-55% by weight (wt %) of $SiO_2$, 5-50 wt % of a ceramic auxiliary material, and 15-48 wt % of at least one functional metal oxide, wherein the valence of the metal in the functional metal oxide is the same as the valence of the impurity ions in the molten salt compound.

Among the components of the ceramic ion sieve, $SiO_2$, as a ceramic matrix, is an essential component, and generally present in an amount of 15-55 wt %.

The ceramic auxiliary material forms a covalent bond with the ceramic matrix, for example, $SiO_2$, to form the skeleton of the ion sieve network structure, and the choices of the composition and content of the ceramic auxiliary material have a direct influence on the adsorption performance of the ion sieve network structure. The ceramic auxiliary material may be at least one selected from the group consisting of phosphorous oxide, boron oxide, alumina, zirconia, chromium oxide, iron oxide, zinc oxide, bismuth oxide, cobalt oxide, or titania. As found from repeated experiments in practical application, when two or more of the above ceramic auxiliary materials are blended in combination into the ceramic matrix $SiO_2$, the ion sieve network structure formed by covalent connection of the ceramic auxiliary materials with $SiO_2$ exhibits a much better adsorption effect. For example, boron oxide and alumina are added to $SiO_2$ at a certain ratio.

The metal element in the functional metal oxide serves to replace or extract the impurity metal ions in the molten salt bath. It is found through experiments that the total molar valence of the metal atom in at least one of the functional metal oxides (where the functional metal oxide(s) involved in the reaction is/are not limited to all the functional metal oxides, as long as some of the functional metal oxides involved in the reaction can reduce the impurity metal ions in the molten salt bath to a preset range of concentrations by extraction/replacement) is equal to the total molar valence of the impurity metal ions in the molten salt bath.

Many choices may exist for the functional metal oxide. Firstly, the functional metal oxide may be a monovalent metal oxide, and specifically a single monovalent metal oxide; or a mixture of two or more monovalent metal oxides. Secondly, the functional metal oxide may be a divalent metal oxide, and specifically a single divalent metal oxide; or a mixture of two or more divalent metal oxides. Lastly, the functional metal oxide may be a mixture of a monovalent metal oxide and a divalent metal oxide. Here, the monovalent metal oxide and the divalent metal oxide in admixture include one or more species of monovalent metal oxides and one or more species of divalent metal oxides.

In case that the functional metal oxide is a monovalent metal oxide, the metal element in the metal oxide is an alkaline metal, for example, at least one of lithium, sodium, potassium, and rubidium. The raw material of the monovalent metal oxide is selected from a carbonate, a fluoride, a sulfate, a nitrate, a phosphate, a hydroxide, an oxide, a chloride or a mixture thereof. The raw material of the monovalent metal oxide refers to a material that is reacted during the preparation of the ion sieve according to the present invention and finally exists in the form of the functional metal oxide in the ion sieve product. For example, if the metal impurity ions in the molten salt bath are potassium ions (monovalent), then the raw material of the functional metal oxide may be rubidium carbonate, rubidium fluoride, rubidium sulfate, rubidium nitrate, rubidium phosphate, rubidium hydroxide, rubidium oxide, rubidium chloride or a mixture thereof, and the rubidium oxide finally exists in the ion sieve material as the functional metal oxide. During the use of the ion sieve material, the element rubidium in rubidium oxide serves to extract the impurity metal potassium ions.

In case that the functional metal oxide is a divalent metal compound, the metal element in the metal oxide may be an alkaline earth metal, for example, at least one of magnesium, calcium, strontium, and barium. The raw material of the divalent metal oxide is selected from a carbonate, a fluoride, a sulfate, a nitrate, a phosphate, a hydroxide, an oxide, a chloride or a mixture thereof. For example, if the metal impurity ions in the molten salt bath are magnesium ions (divalent), then the raw material of the functional metal oxide may be calcium carbonate, calcium fluoride, calcium sulfate, calcium nitrate, calcium phosphate, calcium hydroxide, calcium oxide, calcium chloride or a mixture thereof, and the calcium oxide finally exists in the ion sieve material as the functional metal oxide. During the use of the ion sieve material, the element calcium in calcium oxide serves to extract the impurity metal magnesium ions.

In case that the functional metal oxide is a mixture of a monovalent metal oxide and a divalent metal oxide, for example, when the metal impurity ions in the molten salt bath include potassium ions (monovalent) and magnesium ions (divalent), the raw material of the functional metal oxide may be a mixture of the raw materials of the monovalent functional metal oxide and the divalent functional metal oxide above. For example, the raw material is a mixture of rubidium carbonate and calcium carbonate, or a mixture of rubidium sulfate and calcium sulfate, or a mixture of rubidium carbonate and calcium sulfate.

Further, the present invention provides a method for preparing the ion sieve material, which comprises the following steps.

Raw $SiO_2$, a raw ceramic auxiliary material, and a raw material of a functional metal oxide are provided and mixed fully, where the contents in percents by weight of the components in the resultant ion sieve material product are $SiO_2$ 15-55 wt %, and the ceramic auxiliary material 5-50 wt %, and the raw material of the functional metal oxide is used in such an amount that the content of the functional metal oxide obtained after reaction is 15-48 wt % in the finally obtained ion sieve material.

Then, the mixture is heated to 900-1500° C., and stirred to a molten state, to form a metastable ion sieve precursor.

Optionally, after the metastable ion sieve precursor is formed, the metastable ion sieve precursor is quenched by pouring the metastable ion sieve precursor into water at a temperature of 0-90° C., to obtain a granular ion sieve material.

Optionally, after the metastable ion sieve precursor is formed, the metastable ion sieve precursor is cooled slowly to 400-900° C., and processed by mechanically drawing or through extrusion molding, to obtain a flake-like ion sieve material.

Further, the present invention also provides a method of using the ion sieve material, which comprises the following steps.

Firstly, a liquid salt compound to be purified, for example, the salt compound to be purified is heated to a molten liquid state, or a molten salt bath weakened or inactivated after use for a period of time is provided.

Then the ion sieve material is added to the liquid salt compound, and reacted for 5-12 hrs (for example, 5, 8, 10, or 12 hrs) at a temperature that is above the melting temperature of the salt compound, and the ion sieve material is removed after the concentration of the metal ions to be purified in the molten liquid salt compound falls within a preset range. In this reaction step, the ion sieve material is added in such an amount that a sum of the valence of each impurity metal ion purified in the molten liquid salt compound multiplied by a corresponding mole number is equal to a sum of the valence of the metal ion in the functional metal oxide in the ion sieve material that is involved in the reaction multiplied by a corresponding mole number.

The characteristic of the ion sieve material according to the present invention in effectively recovering the activity of a molten salt bath is further described below in connection with specific experimental data.

Example 1

Preparation and Use of Granular Ion Sieve Material

Preparation process: Raw materials were weighed according to various options in the formula in Table 1-1, mixed until uniform, heated to 1000-1500° C. in a ceramic crucible, and stirred to a molten state, to form a stable ion-sieve ceramic network structure. The stable ion-sieve ceramic network structure was cooled by quenching in water at a temperature of 20° C., to obtain a corresponding granular ion sieve material. The composition of the granular ion sieve material was obtained by scanning electron microscopy+ energy spectrum analysis and by normalization to 100%, as shown in Table 1-2.

TABLE 1-1

Raw material ratio of the ion sieve

| Raw material | Weight of raw material (g) |
| --- | --- |
| $SiO_2$ | 325.0 |
| $H_3BO_3$ | 154.5 |
| $Al_2O_3$ | 68.0 |
| $Li_2CO_3$ | 618.2 |
| $LiNO_3$ | 461.5 |
| $ZrO_2$ | 20.0 |

TABLE 1-2

Composition analysis of the granular ion sieve material

| Component | wt % |
| --- | --- |
| $SiO_2$ | 32.5 |
| $B_2O_3$ | 8.7 |
| $Al_2O_3$ | 6.8 |
| $Li_2O$ | 35.0 |
| $ZrO_2$ | 2.0 |
| $Bi2O3$ | 15.0 |
| In total | 100.0 |

Use Procedure:

Application Example 1

TABLE 1-3

Conditions of use in Application Example 1

| Component of the molten liquid salt compound | 100% LiNO$_3$; |
|---|---|
| % by weight of the granular ion sieve material added | 10% |
| Reaction time | 10 hrs |
| Reaction temperature | 390° C. |

TABLE 1-4

Comparison and analysis of the measurement results before and after the use of the ion sieve in Application Example 1

| State | Concentration of main impurity ion, Na (ppm) | Ion concentration tester |
|---|---|---|
| Initial state | 3094 | Atomic Absorption Spectrophotometer |
| After addition of the ceramic ion sieve and reaction | 1052 | |

Application Example 2

TABLE 1-5

Conditions of use in Application Example 2

| Component of the salt compound | 100% LiNO$_3$; |
|---|---|
| % by weight of the granular ceramic ion sieve added | 5% |
| Reaction time | 5 hrs |
| Reaction temperature | 420° C. |

TABLE 1-6

Comparison and analysis of the measurement results before and after the use of the ion sieve in Application Example 2

| State | Concentration of main impurity ion, Na (ppm) | Ion concentration tester |
|---|---|---|
| Initial state | 1387 | Atomic Absorption Spectrophotometer |
| After addition of the ceramic ion sieve and reaction | 402 | |

Example 2

Preparation and Use of Flake-Like Ion Sieve Material

Preparation process: Raw materials were weighed according to various options in the formula in Table 2-1, mixed until uniform, heated to 1000-1500° C. in a ceramic crucible, and stirred to a molten state, to form a stable metastable ion sieve precursor. The stable metastable ion sieve precursor was slowly cooled to 400-900° C., and processed by mechanically drawing or through extrusion molding, to obtain a flake-like ion sieve material. The composition of the flake-like ion sieve material was obtained by scanning electron microscopy+energy spectrum analysis and by normalization to 100%, as shown in Table 2-2.

TABLE 2-1

Raw material ratio of ion sieve

| Raw material | Weight of raw material (g) |
|---|---|
| SiO$_2$ | 355.0 |
| P$_2$O$_5$ | 50.0 |
| H$_3$BO$_3$ | 79.9 |
| Al$_2$O$_3$ | 50.0 |
| NaOH | 148.4 |
| Na$_2$SiO$_3$ | 315.1 |
| ZrO$_2$ | 10.0 |
| Bi$_2$O$_3$ | 40.0 |
| TiO$_2$ | 20.0 |

TABLE 2-2

Composition analysis of the flake-like ion sieve material

| Component | wt % |
|---|---|
| SiO$_2$ | 51.0 |
| P$_2$O$_5$ | 5.0 |
| B$_2$O$_3$ | 4.5 |
| Al$_2$O$_3$ | 5.0 |
| Na$_2$O | 27.5 |
| ZrO$_2$ | 1.0 |
| Bi$_2$O$_3$ | 4.0 |
| TiO$_2$ | 2.0 |
| In total | 100.0 |

Use Procedure:

Application Example 1

TABLE 2-3

Comparison and analysis of the measurement results before and after the use of the ion sieve in Application Example 1

| Component of the salt compound | 100% NaNO$_3$ |
|---|---|
| % by weight of the flake-like ceramic ion sieve added | 10% |
| Reaction time | 12 hrs |
| Reaction temperature | 420° C. |

TABLE 2-4

Comparison and analysis of the measurement results before and after the use of the ion sieve in Application Example 1

| State | Concentration of main impurity ion, Li (ppm) | Ion concentration tester |
|---|---|---|
| Initial state | 15453 | Atomic Absorption Spectrophotometer |
| After addition of the ceramic ion sieve and reaction | 6032 | |

Application Example 2

TABLE 2-5

Comparison and analysis of the measurement results before and after the use of the ion sieve in Application Example 2

| | |
|---|---|
| Component of the salt compound | 100% NaNO₃; |
| % by weight of the flake-like ceramic ion sieve added | 5% |
| Reaction time | 12 hrs |
| Reaction temperature | 450° C. |

TABLE 2-6

Comparison and analysis of the measurement results before and after the use of the ion sieve in Application Example 2

| State | Concentration of main impurity ion, Li (ppm) | Ion concentration tester |
|---|---|---|
| Initial state | 8689 | Atomic Absorption Spectrophotometer |
| After addition of the ceramic ion sieve and reaction | 3429 | |

Example 3

Preparation and Use of Flake-Like Ion Sieve Material

Preparation process: Raw materials were weighed according to various options in the formula in Table 3-1, mixed until uniform, heated to 1000-1500° C. in a ceramic crucible, and stirred to a molten state, to form a stable metastable ion sieve precursor. The stable metastable ion sieve precursor was slowly cooled to 400-900° C., and processed by mechanically drawing or through extrusion molding, to obtain a flake-like ion sieve material. The composition of the flake-like ion sieve material was obtained by scanning electron microscopy+energy spectrum analysis and by normalization to 100%, as shown in Table 3-2.

TABLE 3-1

Raw material ratio of ion sieve

| Raw material | Weight of raw material (g) |
|---|---|
| $SiO_2$ | 345.0 |
| $H_3BO_3$ | 97.7 |
| $Al_2O_3$ | 100.0 |
| $K_3PO_4$ | 180.3 |
| KOH | 285.9 |
| $Bi_2O_3$ | 60.0 |
| $TiO_2$ | 20.0 |

TABLE 3-2

Composition analysis of the flake-like ion sieve material

| Component | wt % |
|---|---|
| $SiO_2$ | 34.5 |
| $B_2O_3$ | 5.5 |
| $Al_2O_3$ | 10.0 |
| $K_2O$ | 36.0 |

TABLE 3-2-continued

Composition analysis of the flake-like ion sieve material

| Component | wt % |
|---|---|
| $Bi_2O_3$ | 6.0 |
| $TiO_2$ | 2.0 |
| $P_2O_5$ | 6.0 |
| In total | 100.0 |

Use Procedure:

Application Example 1

TABLE 3-3

Comparison and analysis of the measurement results before and after the use of the ion sieve in Application Example 1

| | |
|---|---|
| Component of the molten liquid salt compound: | 100% KNO₃; |
| % by weight of the flake-like ion sieve material added | 5% |
| Reaction time | 8 hrs |
| Reaction temperature | 450° C. |

TABLE 3-4

Comparison and analysis of the measurement results before and after the use of the ion sieve in Application Example 1

| State | Concentration of main impurity ion, Na (ppm) | Ion concentration tester |
|---|---|---|
| Initial state | 9809 | Atomic Absorption Spectrophotometer |
| After addition of the ceramic ion sieve and reaction | 4659 | |

Application Example 2

TABLE 3-5

Comparison and analysis of the measurement results before and after the use of the ion sieve in Application Example 2

| | |
|---|---|
| Component of the salt compound | 100% KNO₃; |
| % by weight of the flake-like ceramic ion sieve added | 5% |
| Reaction time | 5 hrs |
| Reaction temperature | 480° C. |

TABLE 3-6

Comparison and analysis of the measurement results before and after the use of the ion sieve in Application Example 2

| State | Concentration of main impurity ion, Na (ppm) | Ion concentration tester |
|---|---|---|
| Initial state | 4690 | Atomic Absorption Spectrophotometer |
| After addition of the ceramic ion sieve and reaction | 2132 | |

Application Example 3

TABLE 3-7

Comparison and analysis of the measurement results before and after the use of the ion sieve in Application Example 3

| | |
|---|---|
| Component of the salt compound | 100% $KNO_3$; |
| % by weight of the flake-like ceramic ion sieve added | 10% |
| Reaction time | 12 hrs |
| Reaction temperature | 480° C. |

TABLE 3-8

Comparison and analysis of the measurement results before and after the use of the ion sieve in Application Example 3

| State | Concentration of main impurity ion, Li (ppm) | Ion concentration tester |
|---|---|---|
| Initial state | 12800 | Atomic Absorption Spectrophotometer |
| After addition of the ceramic ion sieve and reaction | 2380 | |

Example 4

Preparation and Use of Flake-Like Ion Sieve Material

Preparation process: Raw materials were weighed according to various options in the formula in Table 4-1, mixed until uniform, heated to 1000-1500° C. in a ceramic crucible, and stirred to a molten state, to form a stable metastable ion sieve precursor. The stable metastable ion sieve precursor was slowly cooled to 400-900° C., and processed by mechanically drawing or through extrusion molding, to obtain a flake-like ion sieve material. The composition of the flake-like ion sieve material was obtained by scanning electron microscopy+energy spectrum analysis and by normalization to 100%, as shown in Table 4-2.

TABLE 4-1

Raw material ratio of ion sieve

| Raw material | Weight of raw material (g) |
|---|---|
| $SiO_2$ | 250.0 |
| $H_3BO_3$ | 97.7 |
| $Al_2O_3$ | 50.0 |
| KOH | 238.2 |
| $Na_3PO_4$ | 176.3 |
| $Na_2SiO_3$ | 196.9 |
| $Bi_2O_3$ | 80.0 |

TABLE 4-2

Composition analysis of the flake-like ion sieve material

| Component | wt % |
|---|---|
| $SiO_2$ | 34.7 |
| $B_2O_3$ | 5.5 |
| $Al_2O_3$ | 5.0 |
| $K_2O$ | 20.0 |
| $Na_2O$ | 20.0 |
| $P_2O_5$ | 7.6 |
| $Bi_2O_3$ | 8.0 |
| In total | 100.0 |

Use Procedure:

Application Example 1

TABLE 4-3

Comparison and analysis of the measurement results before and after the use of the ion sieve in Application Example 1

| | |
|---|---|
| Component of the molten liquid salt compound: | 50% $KNO_3$ + 50% $NaNO_3$ |
| % by weight of the flake-like ion sieve material added | 10% |
| Reaction time | 10 hrs |
| Reaction temperature | 420° C. |

TABLE 4-4

Comparison and analysis of the measurement results before and after the use of the ion sieve in Application Example 1

| State | Concentration of main impurity ion, Na (ppm) | Concentration of main impurity ion, Li (ppm) | Ion concentration tester |
|---|---|---|---|
| Initial state | 120070 | 12623 | Atomic Absorption Spectrophotometer |
| After addition of the ceramic ion sieve and reaction | 109043 | 8790 | |

Application Example 2

TABLE 4-5

Comparison and analysis of the measurement results before and after the use of the ion sieve in Application Example 2

| | |
|---|---|
| Component of the salt compound | 50% $KNO_3$ + 50% $NaNO_3$ |
| % by weight of the flake-like ceramic ion sieve added | 5% |
| Reaction time | 5 hrs |
| Reaction temperature | 460° C. |

TABLE 4-6

Comparison and analysis of the measurement results before and after the use of the ion sieve in Application Example 2

| State | Concentration of main impurity ion, Na (ppm) | Concentration of main impurity ion, Li (ppm) | Ion concentration tester |
|---|---|---|---|
| Initial state | 119858 | 8623 | Atomic Absorption Spectrophotometer |
| After addition of the ceramic ion sieve and reaction | 113087 | 4972 | |

Example 5

Preparation and Use of Flake-Like Ion Sieve Material

Preparation process: Raw materials were weighed according to various options in the formula in Table 5-1, mixed until uniform, heated to 1000-1500° C. in a ceramic crucible, and stirred to a molten state, to form a stable metastable ion sieve precursor. The stable metastable ion sieve precursor was slowly cooled to 400-900° C., and processed by mechanically drawing or through extrusion molding, to obtain a flake-like ion sieve material. The composition of the flake-like ion sieve material was obtained by scanning electron microscopy+energy spectrum analysis and by normalization to 100%, as shown in Table 5-2.

TABLE 5-1

Raw material ratio of ion sieve

| Raw material | Weight of raw material (g) |
|---|---|
| $SiO_2$ | 418.0 |
| $H_3BO_3$ | 85.3 |
| $Al_2O_3$ | 71.0 |
| $K_3PO_4$ | 276.4 |
| KOH | 137.0 |
| $BaCO_3$ | 94.0 |

TABLE 5-2

Composition analysis of the flake-like ion sieve material

| Component | wt % |
|---|---|
| $SiO_2$ | 41.8 |
| $B_2O_3$ | 4.8 |
| $Al_2O_3$ | 7.1 |
| $K_2O$ | 18.4 |
| $P_2O_5$ | 9.2 |
| BaO | 7.3 |
| In total | 100.0 |

Use Procedure:

Application Example 1

TABLE 5-3

Comparison and analysis of the measurement results before and after the use of the ion sieve in Application Example 1

| Component of the molten liquid salt compound | 90% $KNO_3$ + 10% $Ba(NO_3)_2$ |
|---|---|
| % by weight of the flake-like ion sieve material added | 10% |
| Reaction time | 5 hrs |
| Reaction temperature | 480° C. |

TABLE 5-4

Comparison and analysis of the measurement results before and after the use of the ion sieve in Application Example 1

| State | Concentration of main impurity ion, Na (ppm) | Concentration of main impurity ion, Mg (ppm) | Ion concentration tester |
|---|---|---|---|
| Initial state | 15563 | 7836 | Atomic Absorption Spectrophotometer |
| After addition of the ceramic ion sieve and reaction | 6590 | 3386 | |

Application Example 2

TABLE 5-5

Comparison and analysis of the measurement results before and after the use of the ion sieve in Application Example 2

| Component of the salt compound | 90% $KNO_3$ + 10% $Ba(NO_3)_2$ |
|---|---|
| % by weight of the flake-like ceramic ion sieve added | 10% |
| Reaction time | 12 hrs |
| Reaction temperature | 500° C. |

TABLE 5-6

Comparison and analysis of the measurement results before and after the use of the ion sieve in Application Example 2

| State | Concentration of main impurity ion, Na (ppm) | Concentration of main impurity ion, Mg (ppm) | Ion concentration tester |
|---|---|---|---|
| Initial state | 16853 | 9464 | Atomic Absorption Spectrophotometer |
| After addition of the ceramic ion sieve and reaction | 6946 | 3507 | |

In the above five examples, the deteriorated molten liquid salt mixture to which the ion sieve material is added is a salt compound deteriorated after a few months of use in the industry.

In the five examples, ion sieve materials of various compositions are added to different concentrations of deteriorated liquid salt mixtures, and the impurity ion concentrations before and after the ion sieve materials are used are measured, compared, and analyzed. Apparently, it is found that the impurity ions such as Li, Na, and Mg in the deteriorated liquid salt mixture are considerably extracted by or adsorbed onto the ion sieve material of the present invention, whereby the molten liquid salt mixture is purified.

Compared with the prior art, the present invention has the following advantages.

Firstly, the choices of the components and the setting of the contents thereof in the ion sieve material are advantageous. Specifically, a ceramic auxiliary material of particular content is used to improve the polar covalent bond and the ionic bond formed with $SiO_2$, and a functional metal oxide of particular content is used in combination, such that the finally obtained ion sieve material has superior impurity ion adsorbing performance.

Notably, it is found through quantities of experiments that when the content of $SiO_2$ is 30-50 wt % and the content of the functional metal oxide is 18-36 wt %, the ion sieve material prepared has a good effect in application.

Secondly, because the factors critical to the ion sieve material of the present invention lies in the choices of the components and the setting of the contents thereof, the preparation is simple and convenient and the preparation process is easy; and different forms of ion sieve materials can be obtained by different ways of cooling.

Thirdly, during the use of the ion sieve material according to the present invention, the activity of the molten salt compound can be recovered efficiently by virtue of the ratio of the components in the ion sieve material, while no other impurity ions are introduced into the molten salt compound; and the metal impurity ions in the molten salt compound are effectively directionally removed, and the spent ion sieve causes no pollution to the environment.

Lastly, because of the diverse processes for producing the ion sieve material in the present invention, various forms of ion sieve materials can be obtained, whereby the ion sieve material can be used in different forms in recovering the purity of the salt compound.

The invention claimed is:

1. A method for preparing an ion sieve material, comprising the steps of:
    providing raw $SiO_2$, a raw auxiliary material, and a raw material of a functional metal oxide, and mixing fully, wherein the contents in percents by weight of the components in the resultant ion sieve material product are $SiO_2$ 15-55 wt %, the auxiliary material 5-50 wt %, and the functional metal oxide 15-48 wt %; and
    heating the mixture to 900-1500° C. and stirring to a molten state, to form a metastable ion sieve precursor;
    cooling the metastable ion sieve precursor to 400-900° C., and processing by mechanically drawing or through extrusion molding, to obtain a flaky ion sieve material.

2. The method for preparing an ion sieve material according to claim 1, further comprising: quenching the metastable ion sieve precursor by pouring the metastable ion sieve precursor into water at a temperature of 0-90° C., to obtain a granular ion sieve material.

3. A method of using an ion sieve material, comprising the steps of:
    providing a molten liquid salt compound to be purified; and adding an ion sieve material to the molten liquid salt compound, and reacting at a temperature that is above the melting temperature of the liquid salt compound; and removing the ion sieve material after the concentration of the impurity metal ions to be purified in the molten liquid salt compound falls within a preset range; wherein the ion sieve material comprises, based on the weight of the ion sieve material, 15-55% by weight (wt %) of $SiO_2$, 5-50 wt % of an auxiliary material, and 15-48 wt % of at least one functional metal oxide, wherein the metal in the functional metal oxide is a monovalent and/or divalent metal.

4. The method of using an ion sieve material according to claim 3, wherein a sum of the valence of each impurity metal ion purified in the molten liquid salt compound multiplied by a corresponding mole number is equal to a sum of the valence of the metal ion in the functional metal oxide in the ion sieve material that is involved in the reaction multiplied by a corresponding mole number.

* * * * *